G. S. CLASON.
MAP CABINET.
APPLICATION FILED JAN. 31, 1916.

1,257,580.

Patented Feb. 26, 1918.
3 SHEETS—SHEET 1.

WITNESSES:
Andrew Daniel Jr.
H. Ellis Sealing

INVENTOR
George S. Clason

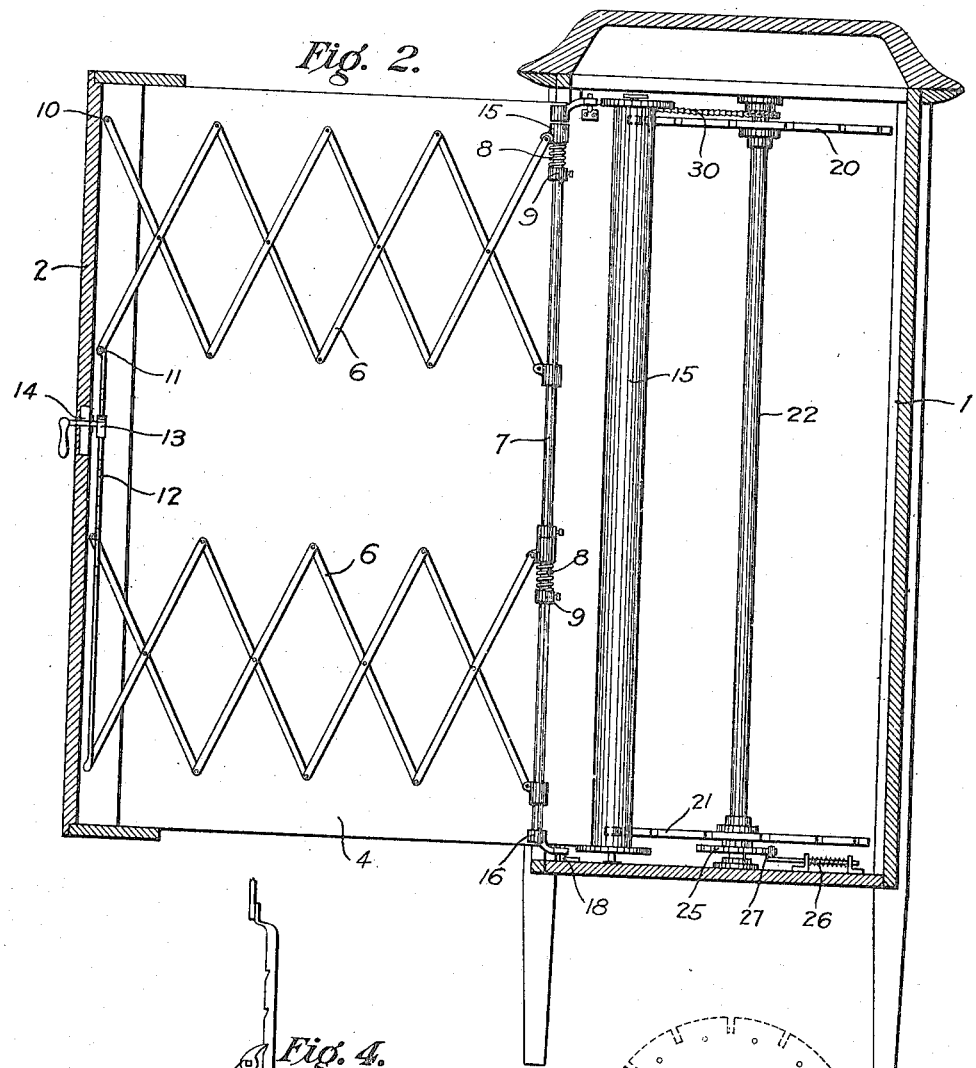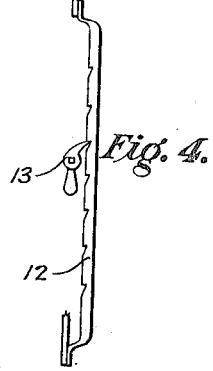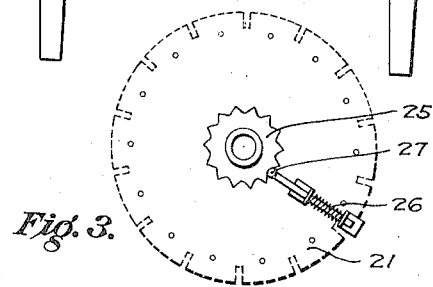

G. S. CLASON.
MAP CABINET.
APPLICATION FILED JAN. 31, 1916.

1,257,580.

Patented Feb. 26, 1918.
3 SHEETS—SHEET 3.

WITNESSES:

INVENTOR

UNITED STATES PATENT OFFICE.

GEORGE S. CLASON, OF DENVER, COLORADO.

MAP-CABINET.

1,257,580.     Specification of Letters Patent.     Patented Feb. 26, 1918.

Application filed January 31, 1916. Serial No. 75,400.

*To all whom it may concern:*

Be it known that I, GEORGE S. CLASON, a citizen of the United States, residing in the city and county of Denver, State of Colorado, have invented a new and useful Map-Cabinet, of which the following is a specification.

My invention relates to improvements in cabinets for holding and displaying maps, charts, pictures, diagrams, drawings, blue prints, cloth blackboards, or other articles, the nature of which permits them to be wrapped around a spring curtain roller.

The objects of my invention are to house in a compact cabinet a large number of different subjects, and to provide means for readily exhibiting any of these.

The operation of my cabinet, both in the selection and in the display, is mechanical, without the necessity of the hands of the operator coming in contact with the subject being displayed.

The customary method of displaying a number of maps has been by means of cabinets, attached to the side wall of a room, containing maps attached to horizontal spring rollers. The principle of my cabinet is new and distinct. I utilize vertical rollers and build the container in suitable form to stand on the floor. To permit of proper display of the maps in my cabinet, I equip it with a rolling display board attached to a draw-bar. By means of an index and selector, any map can be moved into position to be drawn from the cabinet by the draw-bar, which at the same time, pulls out the rolling display board, and the map is thereby exposed on the surface of a smooth, even board. This board can be drawn forth as far as desired, up to its limit of extension, and is hinged to the front of the cabinet by the mechanism controlling it, so that it can be swung back or forth.

I attain these objects by the mechanism illustrated in the accompanying drawings, in which—

Fig. 2, is a lateral cross section, showing the method of extending the display board in its true position, as maintained by lazy tong levers.

Fig. 3, is a view of the automatic stop, which operates in connection with the selector and prevents the container from stopping at other than actual points of delivery.

Fig. 4, is a detail of the latch, which also shows in Fig. 2, and maintains the display board extended at any desired position.

Figure 1:
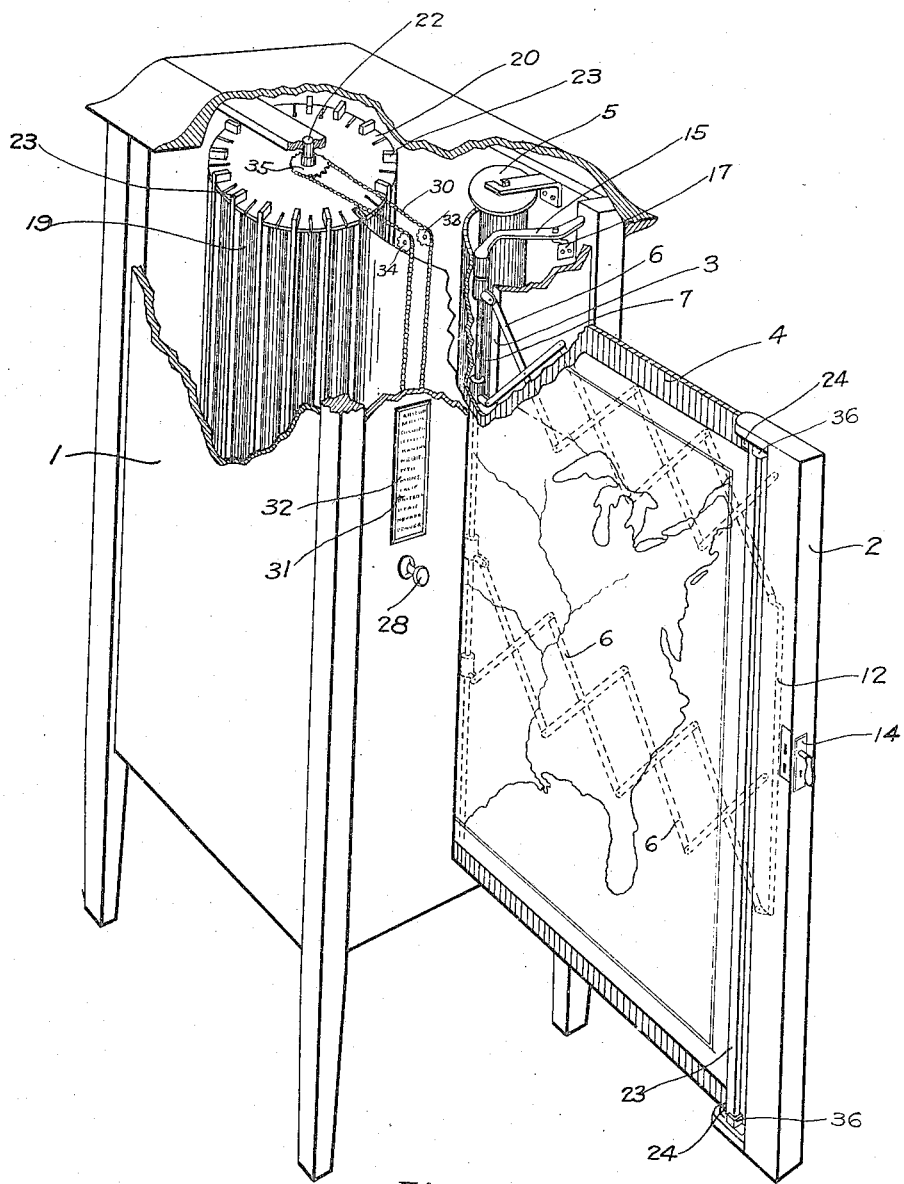
Figure 1, is a perspective view of the entire machine showing the display board partially extended. A portion of the cabinet is shown as cut away to show the arrangement within.
Figure 5:
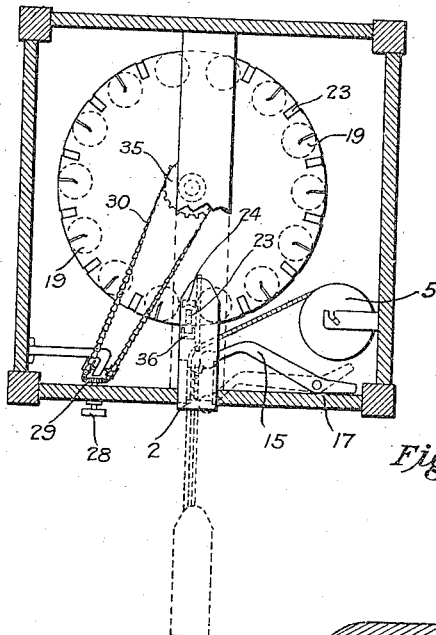

Fig. 5, is a cross section showing the position assumed by the various parts when the cabinet is closed. It will be noted in this figure that when the container is rotated, the rods attached to the outside edge of the maps pass between the grippers on the draw-bar. The automatic stop shown in Fig. 3 prevents the container from stopping in any position except where one of the rods is directly between the grippers.

Figure 6:
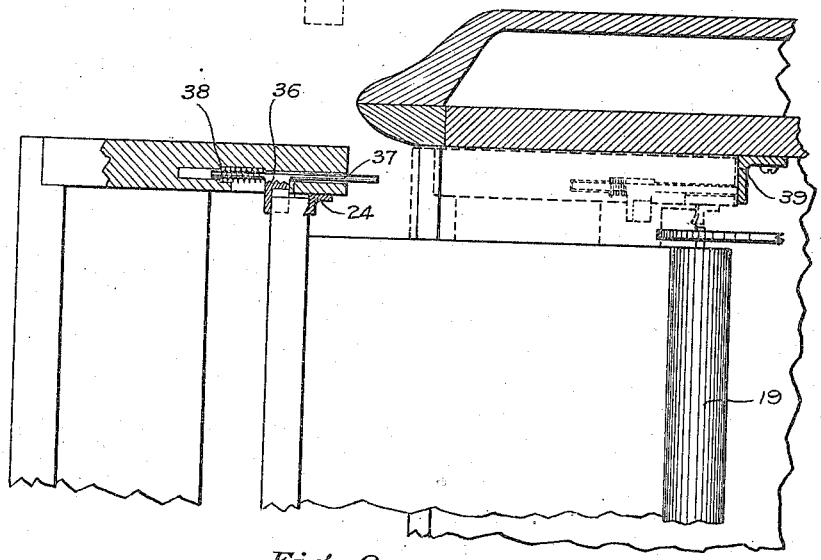

Fig. 6, shows in detail the upper end of the draw-bar being pulled forth from the cabinet. It also shows in dotted lines the position which it assumes when closed. The display board is omitted from this figure. Fig. 6 also illustrates the position assumed by the fingers of the grippers when the draw-bar is closed as well as when it is pulled out.

Similar numerals refer to similar parts throughout the several views.

Number 1 represents a cabinet made of metal, wood, or other suitable material; 2 represents a draw-bar; 3, is a slot in the front of the cabinet into which the draw-bar 2 fits; 4, represents a display board made of thin strips hinged together on one side. There are various methods by which this board could be made to slide or fold within the cabinet. I have shown it as preferably wound around the spring roller 5, which is held in position by suitable bearings at top and bottom. 6, represents lazy tong levers, one or more of which may be used to carry the weight of the draw-bar, display board and map, as they are pulled out of the cabinet; also to form a rigid back for the display board, causing it to assume the form of a plane as it is unwound from the spring roller and drawn forth. 7, represents a shaft to which one side of each lazy tong lever is held in its position by means of a spring 8 and collar 9. These levers are attached to the draw-bar 2 by the pins 10. The loose ends 11 are connected by the bar 12, which contains notches that engage the catch 13 of the door latch 14 and lock the curtain at any extended position desired. The lock 14 also contains a spring door latch which engages an opening in the side of the slot 3 and latches the draw-bar in position when closed.

The shaft 7 is carried by swinging arms 15 and 16, which are pivoted on pins 17 and 18, attached to the side and bottom of the cabinet respectively. This construction permits the entire operating mechanism of the draw-bar and display board to be inclosed within cabinet when not in use. When the draw-bar is pulled out the shaft 7 swings forward into the slot 3 and acts as a hinge for the display board to be swung back and forth. 19, represents the spring rollers containing maps. The cylindrical container which holds the maps to be displayed, is comprised of the top disk 20, the bottom disk 21 and the shaft 22 revolving in fixed bearings. Disk 20 contains slots into which the bars of the spring rollers can be slipped; also slots for holding the rods 23, which are attached to the sides of the maps or charts wound around the rollers. Disk 21 contains corresponding slots for the rods and holes for inserting the pins at the bottoms of the rollers. It will be noted that the rods 23 are longer than the spring rollers and project above the disk 20 and below the disk 21. The draw-bar 2 is equipped with grippers 24—24, between which the rods 23 pass when the draw-bar is closed and the container is revolved. 25 is a star wheel, mounted on the shaft 22 of the container. 26 is a spring catch, having a rolling bearing 27, which engages the teeth of the wheel 25. This spring catch 26 and star wheel 25 form an automatic stopping device which permits the shaft 22 to be revolved, but are so adjusted that it will not stop unless at a point where one of the rods 23 is in a position to be engaged by the grippers 24, if the draw-bar 2 is pulled out. The container is revolved by means of the knob 28 on the front of the cabinet, which operates the sprocket wheel 29 and the sprocket chain 30. Attached to the sprocket chain 30 is an arrow 31, the point of which moves up and down the index 32 and shows which map in the container is in position for delivery to the grippers. The sprocket chain 30 passes over the guide wheels 33 and 34 and around the sprocket 35 on the shaft 22. The grippers 24 comprise a movable part 36, operated by a push rod 37 and a coil spring 38. When the draw-bar is closed the push rod 37 is engaged by the stop 39 and forced back until it clears the rod 23. When the draw-bar is released the fixed member 24 of the gripper draws the rod forward until the movable member 36 engages it and holds it firmly in position until the draw-bar is again pushed back into the cabinet.

To operate my cabinet the knob 28 is turned until the arrow 31 points to the name of the map to be exhibited. This revolves the container until the rod for that map is in a position between the fingers of the gripper 24. The spring stopping device 26 holds the container at just the proper position. The handle of the latch 13 is then turned to release the draw-bar and the map and display board are drawn forth. The catch 13 engages the notches on the bar 12 as this bar is raised by the extension of the lazy tong levers 6, and locks the draw-bar against the pull of the spring rollers delivering the map and the display board 4.

When extended the display board hinges upon the shaft 7 and can be swung to the right or left at the pleasure of the operator.

A turn of the handle of the latch 14 releases the catch 13 and the draw-bar display board and map can be pushed back into place. Returning the draw-bar to a closed position, returns the rod 23 to its proper slot in the disks 20 and 21 and releases the hold of the gripper upon it. Any other map in the container can then be moved into position for display.

My cabinet and its component parts can be constructed of various materials. It can be built in numerous forms and styles and its different working parts could be altered and various substitutions made. I am aware that prior to my invention, map cabinets have been used having revolving containers with a multiple of spring rollers; I therefore do not claim such a feature. But the other features, being new and original, I claim:

1. In combination with a display cabinet, a cylindrical container, a number of charts mounted on spring rollers within said container, a collapsible display board and means for attaching any one of said charts to said display board, and means for operating said display board.

2. A map cabinet containing a disappearing display board means for engaging a map with the display board and means for operating and controlling the same substantially as set forth.

3. A display board for use in a map cabinet, constructed of narrow rigid strips hinged together laterally to permit withdrawing into a condensed space, and mechanical devices for shaping said display board into the form of a rigid plane when extended for use.

4. In combination with a display cabinet, an extension display board, supporting levers, and a swinging counter shaft carrying one side of said levers and mounted on extension arms pivotally attached within said cabinet, the said display board forming a part of the display mechanism of said cabinet, constructed with its supports in such a manner as to permit folding back entirely within the cabinet when not in use.

5. In combination with a display cabinet, a cylindrical container, an extension display board, a number of maps mounted on spring rollers within said container, rods attached to the outer edges of said maps, and a draw bar fitted with grippers forming a portion of the display mechanism of said cabinet, said grippers being so placed upon said draw bar as to engage the rod of any one of said maps as same are revolved into position for display.

6. In combination with a display cabinet, a cylindrical container, a number of charts mounted on spring rollers within said container, rods attached to said charts and grippers forming a portion of the display mechanism of said cabinet, said grippers being so constructed as to engage the rod attached to any one of said charts if drawn forth for display and stay in engagement until said chart is returned to its original position.

7. In combination with a map cabinet, a draw-bar; a rolling display board attached to said draw-bar; and controlling levers operating between the cabinet and the draw-bar so arranged as to form a plane of the rolling display board when the draw-bar is pulled forth from the cabinet substantially as set forth.

8. In combination with a display cabinet, a cylindrical container, a number of charts mounted on spring rollers within said container, a selecting device for moving any desired chart into position for display, an automatic stopping device for holding said chart in position, rods attached to said charts, mechanical grippers for engaging the rod attached to said chart, a draw bar for drawing said chart forth outside of said display cabinet and a collapsible display board supplying a rigid backing for said chart while being displayed, substantially as described.

GEORGE S. CLASON.

Witnesses:
 ANDREW DANIEL, Jr.,
 HORACE S. CLASON.

Copies of this patent may be obtained for five cents each, by addressing the "Commissioner of Patents, Washington, D. C."